April 4, 1944.     H. GREEN     2,345,968
METHOD OF AND APPARATUS FOR MEASURING
FLOW CHARACTERISTICS IN LIQUIDS
Filed June 29, 1940     2 Sheets-Sheet 1

INVENTOR
HENRY GREEN
BY
ATTORNEY

April 4, 1944.   H. GREEN   2,345,968
METHOD OF AND APPARATUS FOR MEASURING
FLOW CHARACTERISTICS IN LIQUIDS
Filed June 29, 1940   2 Sheets-Sheet 2
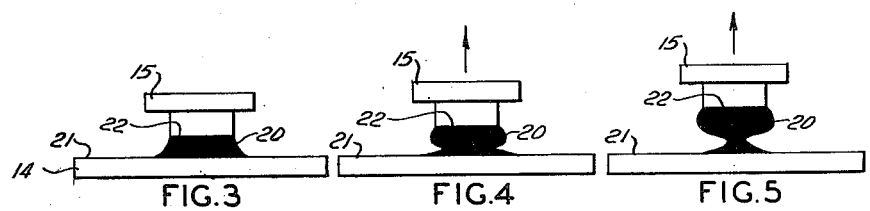
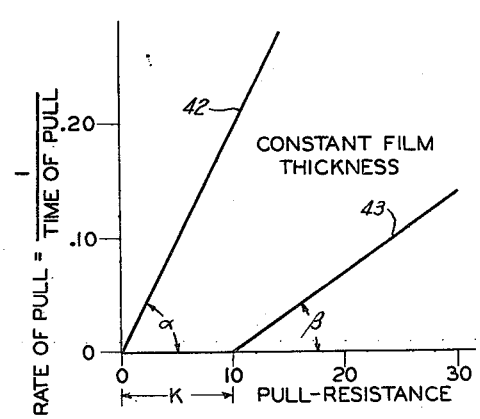
FIG. 6
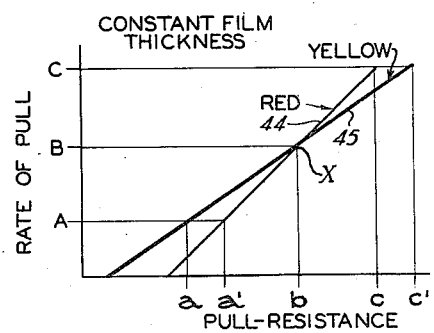
FIG. 7
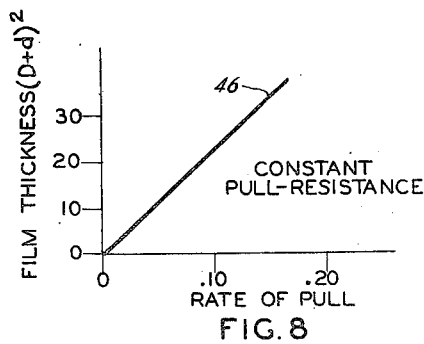
FIG. 8
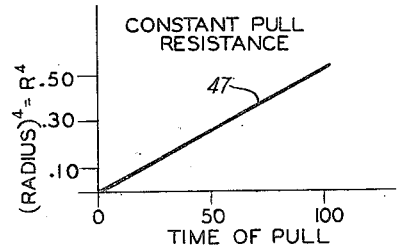
FIG. 9
INVENTOR
HENRY GREEN
BY *Francis H. Bebee*
ATTORNEY Patented Apr. 4, 1944

2,345,968

UNITED STATES PATENT OFFICE 2,345,968

METHOD OF AND APPARATUS FOR MEASURING FLOW CHARACTERISTICS IN LIQUIDS

Henry Green, New York, N. Y., assignor to Interchemical Corporation, New York, N. Y., a corporation of Ohio Application June 29, 1940, Serial No. 348,121

6 Claims. (Cl. 265—11)

The present invention relates to methods of and means for measuring the flow resistance characteristics of liquids, including true liquids and plastics, and relates particularly to the measurement of the tack, yield value, viscosity and similar properties of such liquids, as printing inks, coating compositions and the like.

Heretofore many different methods of measuring the tack, yield value and viscosity of commercially used liquids, such as printing inks for example, have been proposed and used. However, the results obtainable by prior known methods and by the use of instruments designed to carry out such methods have in general left much to be desired. This has been largely due to the costs and complexity of the method and measuring apparatus, the long time and difficulty involved in making measurements and in cleaning the instrument after each test, the waste of solvents required in such cleaning, the relatively large amount of test liquid needed for making a single measurement, the inaccuracies and inconsistent results obtained by the measurements, the limited range of values measurable with any one type of instrument, and various other difficulties and limitations.

I have found that a marked improvement may be obtained over these prior devices and that one or more or all of the above difficulties and limitations may be minimized or substantially avoided in accordance with the method and instrument of the present invention, with the result that consistent measurements, which are adapted to be plotted as linear characteristics, can be quickly and relatively easily made with a low cost, efficiently operating instrument of simple construction, requiring only a few minutes for completing a measurement, requiring only a few drops of the test liquid, and adapted for adjustment to measure a very wide range of values. The invention is particularly suited for determining the tack and other flow characteristics of printing inks, to aid in the selection of suitable inks, especially for printing at high speeds.

In accordance with one aspect of the present invention, the test liquid is formed into a thin film having a pair of parallel faces of predetermined area and predetermined thickness, and the time required for a given force to increase the existing separation between the two faces of the film is then observed as a measure of the tack. By making two or more such measurements with a different separating force for each measurement, a linear plot may be obtained to indicate whether the liquid is a true liquid or plastic and to show the tack, yield value and viscosity of the liquid. An instrument adapted to carry out the method utilizes a mechanism for preparing the film for test, and serves as a means for making quantitative observations of the tack, yield value, viscosity, or other flow characteristics to be tested.

When used in this description, the term "tack" means the flow resisting property of a fluid mass, consisting of a true liquid or a plastic, which is characterized by the pull resistance opposing the separation of two solid surfaces bonded together by a film of the fluid mass mutually adhered to the solid surfaces. The amount of tack, at any given temperature, depends on the thickness of the film, its area, and the rate of pull. Since the tack varies with these three factors, it has no fixed value except for a given rate of pull, and a given thickness and area of film, the relation being expressed by an equation given hereinafter.

The term "yield value" as used herein refers to a tangential force equivalent to that acting on an area of one square centimeter that will just produce a flow of a plastic at an infinitely slow rate relative to an area of one square centimeter parallel to the first area and spaced perpendicularly therefrom by a distance of one centimeter. It is measured in dynes per square centimeter.

The coefficient of viscosity for a true liquid is the tangential force equivalent to that acting on an area of one square centimeter which will produce a rate of flow of one centimeter per second relative to an area of one square centimeter parallel to the first area and spaced perpendicularly therefrom by a distance of one centimeter. The unit of measure is the poise. For a plastic, the coefficient of viscosity is the same as that for a liquid, except that it is the force in excess of the yield value. For the purpose of simplification, the term "viscosity" is employed hereinafter in place of the expression "coefficient of viscosity," where the meaning of the term is otherwise clear without the longer expression.

These and other features and objects of the invention will be understood more clearly upon consideration of the following detailed description of a preferred embodiment thereof, and the accompanying drawings in which:

Figs. 3, 4 and 5 are diagrams illustrating, substantially in actual size, three stages in the operation of the instrument; and Figs. 6, 7, 8 and 9 are graphs showing the results of certain measurements with the instrument.

Figure 1:
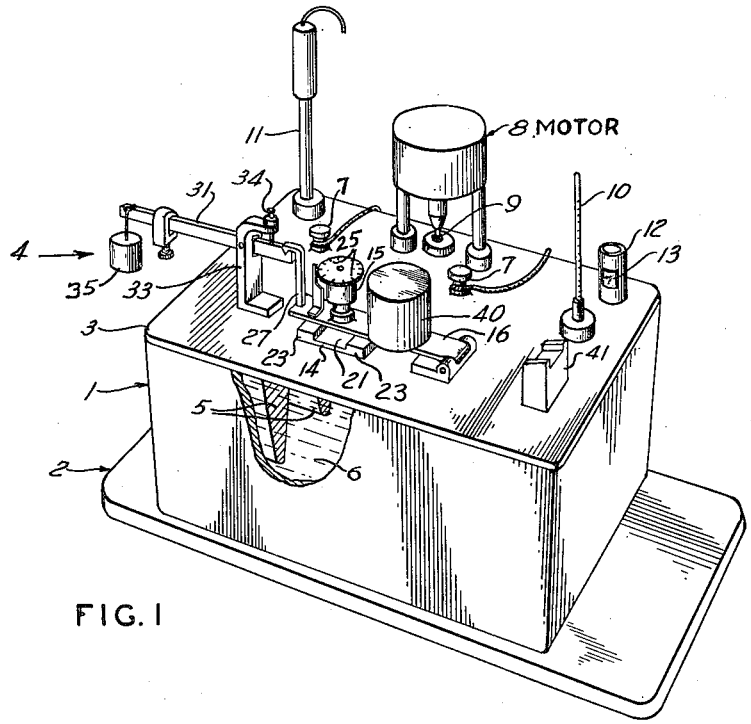
Fig. 1 is a perspective view showing one form of measuring instrument embodying the features of my invention.
Figure 2:
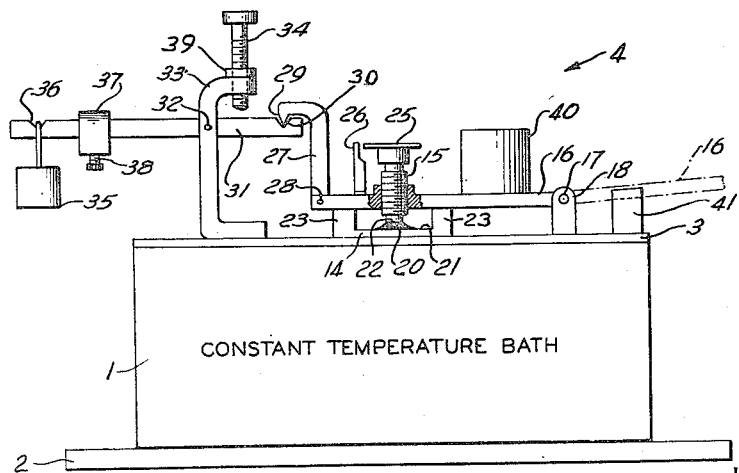
Fig. 2 is a front elevational view of the instrument of Fig. 1, shown schematically.

Referring to Figs. 1 and 2, it will be observed that the measuring apparatus comprises a constant temperature tank or bath 1 having a horizontal base 2 and a removable metal cover plate 3 which is arranged parallel to the base 2. The plate 3 forms a liquid-tight sealed closure for the bath and serves as a base for supporting a combined tackmeter and viscometer 4. One or more metallic fins 5, having an efficient thermally conducting connection with the bottom of plate 3, project downwardly from the plate 3 into a bath liquid 6 and act to maintain the plate 3 and the parts of the tackmeter 4 adjacent the plate 3 at a uniform temperature substantially equal to that of the bath. The bath liquid 6 may be any suitable non-volatile, low-viscosity material, such as water or mineral oil, which does not have a corrosive effect on the parts in contact therewith.

The temperature of the bath is regulated by a suitable electric heater 7 supported by the plate 3 and projecting downwardly therefrom into the bath liquid 6. An electric motor 8 is mounted on the plate 3 and has a stirrer 9 connected thereto and projecting into the bath for agitating the liquid 6 and maintaining it at a uniform temperature throughout the bath. The bath temperature is indicated by a thermometer 10, supported by the plate 3 and projecting therethrough into the bath. An adjustable electric thermostat 11 may be connected in any well known manner (not shown) with the heater 7 and a source of electric current (not shown), to maintain the bath at any desired predetermined temperature. Since the tack or flow characteristic of most liquids varies with the temperature, the tests for these characteristics are preferably made either at a standard temperature, preferably slightly above ordinary room temperature, for example at 30° C., or at the temperature at which the liquid under test is to be employed in practice. In the event that the room temperature at the place of operation is above the desired operating temperature, it will be understood that a cooling coil or other suitable cooling device may be used in place of the electric heater 7 or in conjunction therewith.

The bath is filled through the top of a standpipe 12 which is supported by the plate 3 and projects therethrough to the bath. A glass window 13 may be provided in pipe 12 to show the level of the bath liquid, which is preferably kept above the level of the plate 3 to insure good thermal contact between the plate 3 and the bath liquid. It will be understood that all seams at the places where heater 7, stirrer 9, thermometer 10, thermostat 11 and standpipe 12 pass through the plate 3, are made liquid tight to prevent leakage therethrough of the bath liquid 6.

As indicated in Figs. 1 and 2, the combined tackmeter and viscometer 4 includes an anvil contact block 14 and a micrometer thumb screw 15 which is threaded through the left or free end of a substantially horizontal finger lever 16. The right hand end of said finger lever 16 is hinged to turn with minimum friction on suitable pivot bearings 17, supported in a bracket 18 secured to the plate 3. Thumb screw 15 is shown in contact with a predetermined quantity of a liquid 20 which is placed on the anvil 14 for testing. Since the liquid 20 to be tested is placed on the anvil 14 and should approach the temperature of the bath as quickly as possible, said anvil is made thin enough to avoid any unnecessary drop of temperature therein and is provided with a flat rectangular top liquid receiving surface 21 which is preferably horizontal and lapped smooth. The vertical screw 15 has a coaxial cylindrical lower end which is provided with a flat and smooth horizontal contact surface 22 of predetermined diameter and area complementary to and parallel with the anvil surface 21. It will be understood that the screw 15 may be replaced readily by a similar screw having a surface 22 with a different predetermined diameter and area. At each of the left and right ends of the anvil block 14 is a raised portion or spacer 23 which together furnish positive abutments against which lever 16 may swing in a counterclockwise direction, to the position shown in Fig. 2. This fixes the horizontal position of finger 16 and the position of screw 15 with its axis held exactly in a position normal to and centralized over the anvil surface 21, so that the finger contact surface 22 may register with the surface 21 and be parallel thereto for all positions to which the screw may be turned. While I have shown the cooperating surfaces 21 and 22 as parallel, flat and smooth, it will be understood, that they may be of any desired fixed and predetermined configuration and relationship, such as curved, formed with a multiple dot system like a half-tone plate, or the like.

The area of the anvil surface 21 is preferably considerably larger than that of finger contact surface 22, in order that surface 21 may be of sufficient size to register fully with the largest circular surface 22 to be employed therewith. The upper surface of the enlarged head of screw 15 is preferably provided with suitably calibrated micrometer markings 25 radially of the screw, to be read in conjunction with the fixed index pin 26, supported by the lever 16 and positioned adjacent the periphery of the screw, for indicating directly the distance between the respective contact surfaces 21 and 22.

A vertical link 27 is hinged to turn with minimum friction on pivot bearings 28 in the left end of the finger lever 16. This link has a V-shaped upper end 29 hooked loosely into a larger V-shaped notch 30 at the right end of a horizontal balance bar 31 which turns with minimum friction on pivot bearings 32 provided in a vertical post 33, fastened at its lower end to the plate 3. The lower end of a thumb screw 34, threaded through a horizontally projecting upper end of vertical post 33, serves as an adjustable stop, limiting counterclockwise rotation of the balance bar 31 in response to a weight 35 hung in a notch 36 at the left end of said bar. A nut 39 is provided to lock the screw 34 in any adjusted position. A counter weight 37 is slidably mounted on the bar 31 and may be moved to any desired position thereon to compensate to the desired degree for the component of force due to the downward pull of link 27 on notch 30 when finger 16 carries no superimposed weight and when there is no liquid 20 in contact with the screw 15. The weight 37 may be locked in any adjusted position by means of a thumb screw 38.

In order to squeeze out the drop of liquid 20 into the desired film or lamina bounded by the surfaces 21, 22, when the finger 16 abuts positively upon the spacers 23, a removable weight 40 may be placed on the finger lever 16. It will be understood that for the purpose of clear representation, the liquid film 20 is shown with exaggerated thickness. In practice, the film 20 may have a thickness within the range from a fraction of a thousandth of an inch up to twenty or more thousandths, depending upon the tack of the liquid. The weight 40 serves to overcome any resistance to the flow of the liquid incidental to the formation of the desired film 20, and insures positive abutment of finger 16 on the spacers 23, so that the position of the finger is accurately reproducible. It will be understood that the weight 40 is removed from the finger 16 during adjustment of the counter-weight 37.

When it is desired to clean the surfaces 21, 22, and apply the test liquid 20 thereto, the finger 16 may be swung to the right in a clockwise direction from the position shown in Figs. 1 and 2, until the free end thereof, indicated by the dot-dash lines in Fig. 2, rests upon a supporting block 41 attached to plate 3. Both surfaces 21, 22, then face upwardly in positions where they are readily accessible for such attention as may be needed. The liquid 20 to be tested, such as printing ink, for example, may be applied to the surface 22 by rubbing with a rod to which a quantity of the liquid has adhered after being dipped into a supply of the liquid. Enough liquid adheres to the screw 15, to cover not only the flat surface 22, but to extend over the edge of the flat surface and on the cylindrical surface of the contact end of screw 15, up to a point about half way between the surface 22 and the upper extremity of the cylindrical portion of screw 15 or the adjacent surface of the finger lever 16. The finger 16 is then swung back to the left, the weight 40 being placed thereon for the purpose explained above, and allowed to remain while the liquid 20 is being brought to the same temperature as the block 14 and the bath 1.

After the liquid 20 has reached the desired temperature, the weight 40 is removed from finger 16. The unbalanced component of force due to the weight 35 is then free to act on bar 31 and exert a lifting force through the link 27 on the finger 16, the test liquid 20 being the only restraint to lifting of surface 22, it being assumed that pivot friction and inertia of the moving parts are made so small as to be negligible for the purposes of the present measurements.

Since the lateral boundaries of the liquid film 20, Figs. 2 and 3, in any plane parallel to the surfaces 21, 22, are substantially equidistant from the central vertical axis normal to the surfaces 21, 22, the liquid is symmetrically distributed around the vertical axis. When the finger contact surfaces 21, 22 separate from each other, as indicated in Fig. 4 by the arrow, the liquid flows radially inward toward the vertical axis, and forms a constriction or neck-down portion between the upper and lower lobes of the liquid 20 (Fig. 4). Because of the thinness of the film 20, the flow of the liquid along any radial element of the film is substantially a lamina or capillary flow. This avoids many of the problems encountered in attempting to employ capillary tubes for measurements of this character and also avoids many of the complexities involved in instruments which use such a quantity of thick film of liquid that a non-laminar or plug flow results and causes a non-linear relationship between the rate of flow and the force applied. It will be appreciated that the nature of liquid flow is in itself so complicated that the avoidance of any additional source of complication is of great importance when attempting to obtain consistent and dependable measurements. Fig. 5 shows a more advanced stage of separation between the surfaces 21, 22, wherein the flow of liquid has advanced so far that only a small connection remains between the upper and lower lobes of liquid 20, so that the resistance to further separation of the surfaces 21, 22, may be considered negligible.

It will be apparent that the bottom end of the stop screw 34 limits the counterclockwise rotation of the arm 31 under the influence of the weight 35, and adjustment of screw 34 determines the amount by which the separation of surfaces 21, 22 may be increased. The period of time required for the weight 35 to produce this increase of separation, depends on the tack or resistance to flow of the liquid 20, and may be measured by any suitable timing device (not shown) such as a stop watch. By reducing the predetermined starting thickness of the sheet 20, or increasing the diameter of surface 22, the tack or resistance to flow may be increased, thus increasing the time required to close the gap between arm 31 and stop 34, so that the time interval being measured may be made long enough to minimize, or reduce to a negligible amount, errors of measurement resulting from starting and stopping of the timing device. Obviously, the time interval may be shortened by a converse adjustment. Most measurements may be made with sufficient accuracy when the time being measured is of the order of a few seconds up to a minute or more, the accuracy of the measurement increasing, in general, with the length of time interval. With thixotropic materials, however, where the broken down structure reforms when the speed of the motion is reduced, I have found that a long timing period does not increase the accuracy and a timing period of from 5 to 15 seconds apparently gives best results.

In Fig. 6 I have shown the results of measurements made with the instrument of Figs. 1, 2. Values of tack or pull resistance are plotted as abscissas and values of the rate of pull are plotted as ordinates, the rate of pull being the reciprocal of the time of pull. For true liquids, such as varnish, the plot is a straight line starting at the origin, as indicated by plot 42; while for plastics, such as printing inks including a vehicle with a pigment suspended therein, the plot is a straight line which intercepts the axis of abscissas to the right of the origin, as indicated by plot 43, the value of the intercept $k$ being a measure of the yield value of the liquid. The angles alpha and beta are measures of the coefficients of viscosity of the respective liquids. Since the plots are linear, only a few observations are needed for determining each plot. For any one plot, each observation is made with a different weight 35, while the film area, film thickness, and all other adjustments of the instrument remain at constant values throughout the test. The amount of tack depends on both the yield value and the viscosity.

Fig. 7 shows the results of measurements of tack made with the instrument of Figs. 1 and 2, the two plots 44 and 45 being similar to plot 43 of Fig. 6, but having one value X common to the two plots at the ordinate B and abscissa $b$. The plot 44 represents the tack characteristic of a sample of red printing ink, while the plot 45 shows the characteristic of a sample of yellow printing ink. It will be seen that for values of tack below the point X the red ink has a larger tack, for example $a'$, than the yellow ink tack $a$ for the same rate of pull A, whereas above the point X, the red ink has a smaller tack, for example $c$, than the yellow ink tack $c'$ at the same rate of pull C.

It has been the custom for many years to make comparisons of tack of different printing inks by a so-called "finger test" in which the person making the test rubs a few drops of the ink on the tip of a finger and estimates the tack characteristics of the ink by repeatedly bringing the inked finger tip into contact with a paper and lifting the tip therefrom to note the amount of force required to separate the finger from the paper. Since the "finger test" is limited to an estimate of only one point on the tack characteristic, the estimate might easily be based on a condition represented by the point X or so near thereto that the two inks being compared would be considered to have the same tack under all conditions. Erroneous determinations of tack are similarly involved in the customary use of various other methods and instruments relying on a single measurement of the tack. According to my invention, it is possible to make simple and suitably exact measurements to distinguish readily two inks or other plastics whose tack values are equal to each other at some single rate of pull but which have widely different tack values at other rates of pull.

In Fig. 8, a plot 46 of measurements has been made with the instrument of Figs. 1, 2, and shows the relation between the rate of pull and the film thickness. The film thickness is represented by the quantity $(D+d)^2$, in which D is the film thickness and $d$ is a constant for any given finger area 22. The constant $d$ may be determined by plotting $(D+d)^2$ against the rate of pull, where measurements are made at several different values of D, and where a series of plots are then made with the constant $d$ in each plot having a different arbitrarily chosen value until a value of $d$ is found which makes a straight line plot. The resulting value of $d$ may then be used for all future plots of $(D+d)^2$ for measurements of different liquids made with that same finger area 22, the resulting plots being linear for true liquids, and in the case of plastics being curvilinear.

In Fig. 9 a plot 47 has been made with the instrument of Figs. 1 and 2 and shows the linear relation between time of pull and $R^4$, where R is the radius of the finger surface area 22. As in the case of plot 46 of Fig. 8, the linear plot 47 is characteristic of only a true liquid, the plot for a plastic being curvilinear.

I have found that the amount of tack may be expressed empirically by the equation:

$$T = \frac{(w-k)t}{t_p} + k \qquad (1)$$

where T is the tack, $w$ is the weight in grams of the weight 35, $k$ is the intercept in grams on the pull resistance axis of Fig. 6, $t$ is the time of pull in seconds, and $t_p$ is the time in seconds of the printing press which is the time elapsed, in regular operation of a printing press, between the instant a fixed spot of ink on the type contacts the paper and the instant the type leaves the paper.

Equation 1 may also be expressed as follows:

$$T = \frac{\mu_1}{Kt_p} + Cf \qquad (2)$$

where $\mu_1$ is the viscosity of the test liquid, C is an instrument constant pertaining to the yield value, K is an instrument constant pertaining to the viscosity, $f$ is the yield value of the test liquid in dynes per square centimeter, and the other symbols are identified above.

For many purposes I have found it to be more convenient to express the tack characteristic of a given test liquid in terms of the relation between the tack of the test liquid and the tack of a standard true liquid, this being known as relative tack. The standard true liquid may be any liquid such as an oil having a previously determined convenient value of viscosity. The viscosity of the standard may be of any value within a wide range, but should preferably be large enough to permit of convenient measurement by the instrument. For some purposes a standard having a viscosity of approximately twenty poises has been found to provide a convenient reference basis. The relative tack $T/T_0$ may be expressed as follows:

$$\frac{T}{T_0} = \frac{(W-k)t}{W_0 t_0} + \frac{kt_p}{W_0 t_0} \qquad (3)$$

where $T_0$ is the tack of the standard liquid, W is the weight in grams of the weight 35 used with the test liquid, $W_0$ is the weight in grams of the weight 35 used with the standard liquid, $t_0$ the time of pull in seconds for the standard liquid, and the other terms are as identified above. It will be apparent that $W_0 t_0$ is constant for a given oil and a given film thickness and therefore $W_0$ may be any convenient weight not necessarily equal to W.

Equation 3 may also be expressed as follows:

$$\frac{T}{T_0} = \frac{\mu_1}{\mu_0} + \frac{t_p(KC)f}{\mu_0} \qquad (4)$$

where $\mu_0$ is the viscosity of the standard liquid.

For most practical purposes, however, I prefer to use the following simplified form of Equation 3:

$$\frac{T}{T_0} = \frac{(W-k)t}{W_0 t_0} \qquad (5)$$

With this Equation 5, since $W_0 t_0$ is usually known before hand, it is only necessary to determine $k$ by plotting W and $t$ and obtaining the intercept.

The instrument of Figs. 1 and 2 is particularly convenient for use as a viscometer, and can measure the viscosities over a wide range of values by the selection of the proper finger screws 15 having suitable contact areas 22, and by adjustment of the film thickness. It will be understood that a screw 15 with a relatively large area 22 should be used for liquids having a relatively low viscosity, and that a screw with a smaller area 22 should be used for a liquid having a relatively high viscosity. The viscosity $\mu$, in poises, may be measured by the instrument of Figs. 1 and 2 and expressed empirically by the equation:

$$\mu = \frac{(D+d)^2 Ft}{\pi R^4} \qquad (6)$$

where D is the thickness of the film of test liquid, $d$ is the finger constant referred to above in connection with Fig. 8, $\pi = 3.1416$, and the other symbols are as identified above. The measurement requires at most only a few drops of the test liquid as compared with much larger quantities of liquid required with the more important prior viscometers, such for example as those of the Stormer and McMichael types, and the capillary type. Since the quantity of test liquid 20 is small and is spread in a thin film, the time required for bringing it to the desired temperature is only a few minutes as compared with a considerably longer time in prior instruments, and after measurement, the instrument can be completely and quickly cleaned with a few simple operations, the cleaning time being of the order of 30 seconds, as compared with a very much longer time for properly cleaning prior viscometers. A much larger number of measurements may consequently be made within a given time than with prior instruments, and the relatively simple linear relations between the quantities measured as referred to in connection with Figs. 6 to 9 and Equations 1 to 6, greatly expedite the determination of tack, yield value, viscosity, and related useful data.

While the present invention has been illustrated by a specific example of an instrument adapted for use in carrying out the method of the invention, it will be understood that various other instruments may be made to employ this method. The separation between the two faces of the film of test liquid has been described as being increased by moving one face perpendicularly away from the other by means including a hinged finger, but it will be understood that a hinged finger is not the only device capable of performing the desired operations, and that various other forms of moving contact surfaces, such as cooperating plungers, may be utilized for this purpose. Various other forms of the other elements of the instrument may be likewise substituted for the specific forms shown for accomplishing the desired functions, and certain features of the apparatus and steps of the method may be employed without others, without departing from my invention or sacrificing any of its advantages.

I claim:

1. The method of indicating the flow characteristic of a liquid, which includes forming a relatively small quantity of the liquid into a thin film of predetermined thickness having a pair of parallel surfaces, increasing by a predetermined amount the separation between said surfaces by applying a predetermined separating force normal to said surfaces, measuring the time required for said increased separation, repeating said preceding steps with a different predetermined separating force while the other conditions named remain the same, and plotting the reciprocals of said respective time measurements against the respective predetermined forces producing said separations, to indicate the desired flow characteristic.

2. In an instrument for use in measuring the tack of a liquid, a finger having a flat contact surface at its free end, a cooperating anvil having a flat contact surface, means for holding said contact surfaces parallel and in superposed registration with each other but spaced a predetermined distance apart, and means for applying to said finger a predetermined constant force in a direction to increase the separation between said surfaces while the liquid to be tested is mutually adhered to said surfaces.

3. In an instrument for use in measuring the flow resistance of a liquid, a fixed element having a flat contact surface for adherence thereto of the liquid to be tested, a movable element having a flat contact surface for adherence thereto of said liquid, means for positioning said surfaces parallel and in superposed registration with each other but spaced a predetermined distance apart, means for applying to said movable element a predetermined force for moving said movable surface perpendicularly away from said fixed surface while the liquid to be tested is mutually adhered to said surfaces, and a stop for limiting said increased separation to a predetermined amount.

4. In an instrument for use in measuring the tack of a liquid, a base having a flat contact surface for adherence thereto of the liquid to be tested, a finger having a hinge pivoting one end thereof to said base, said finger having at its free end a flat contact surface for adherence thereto of said liquid and having a predetermined area smaller than that of said base surface, means for spacing said finger surface a predetermined short distance from said base surface and for positioning said finger surface parallel with and centralized over said base surface, and means for applying a predetermined lifting force to said finger for increasing the spacing between said surfaces while the liquid to be tested is mutually adhered thereto.

5. In an instrument for use in measuring the tack of a liquid, a base having a flat contact surface for adherence thereto of the liquid to be tested, a finger having a hinge pivoting one end thereof to said base, said finger having at its free end a flat contact surface for adherence thereto of said liquid and having a predetermined area smaller than that of said base surface, means for spacing said finger surface a predetermined short distance from said base surface and for positioning said finger surface parallel with and centralized over said base surface, a balance arm having a fulcrum supported from said base, a detachable link for connecting one end of said balance arm with the free end of said finger, a counterweight on the opposite end of said balance arm from said link for equalizing the forces on opposite sides of said fulcrum when said link connects said arm with said finger and no test liquid is adhered to said finger surface, said arm having a portion on the same end thereof as said counterweight for supporting a test weight, and a stop for limiting the rotation of said arm when a test weight supported on said arm portion lifts said finger in opposition to the tack of a test liquid mutually adhered to said surfaces.

6. In an instrument for use in measuring the tack of a liquid or plastic material, a base having a flat contact surface for adherence thereto of the material to be tested, a finger pivotally connected at one end thereof to said base and having at its free end a flat contact surface for adherence thereto of said material, means for spacing such finger surface a predetermined short distance from such base surface and for positioning such finger surface parallel with and centralized over such base surface, and a balance arm operatively connected to the free end of said finger so that when a predetermined lifting force is applied thereto said arm will cause said finger to be lifted in opposition to the tack of the test material mutually adhered to said surfaces.

HENRY GREEN.